(12) United States Patent
Caulfield et al.

(10) Patent No.: US 9,462,132 B2
(45) Date of Patent: Oct. 4, 2016

(54) ONE-TAP CONFERENCE CALLING ON DEVICES

(71) Applicant: Citrix Systems, Inc., Fort Lauderdale, FL (US)

(72) Inventors: Carey Caulfield, Santa Barbara, CA (US); Patrick Kovacich, Santa Barbara, CA (US); Mike Inglehart, Santa Barbara, CA (US); Zach Davis, Santa Barbara, CA (US); Matt Kuhn, Santa Barbara, CA (US); Michael Post, Santa Barbara, CA (US); Matthew Brooke, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/502,165

(22) Filed: Sep. 30, 2014

(65) Prior Publication Data
US 2016/0094716 A1 Mar. 31, 2016

(51) Int. Cl.
| H04H 60/21 | (2008.01) |
| H04M 3/42 | (2006.01) |
| H04M 3/00 | (2006.01) |
| H04M 3/56 | (2006.01) |
| H04W 4/16 | (2009.01) |

(52) U.S. Cl.
CPC ............... *H04M 3/56* (2013.01); *H04W 4/16* (2013.01)

(58) Field of Classification Search
CPC .......................... H04W 4/16; H04W 76/043
USPC ........................ 455/2.01, 416, 418
See application file for complete search history.

(56) References Cited

U.S. PATENT DOCUMENTS

| 7,826,401 | B2* | 11/2010 | Swanson | H04L 12/1813 370/261 |
| 8,576,750 | B1* | 11/2013 | Hecht | H04M 3/56 370/261 |
| 8,599,723 | B1* | 12/2013 | Hecht | H04M 3/56 370/261 |
| 8,689,313 | B2* | 4/2014 | Swanson | G06Q 10/10 709/231 |
| 8,872,880 | B1* | 10/2014 | Matselyukh | H04N 7/148 348/14.01 |
| 8,903,305 | B2* | 12/2014 | Beavers | G09B 5/08 455/2.01 |

(Continued)

OTHER PUBLICATIONS

"Unified Meeting User Guide v. 4.10.12," Product Information Brochure]. ConferenceCall.com, Carrollton, TX. Last modified on Jan. 19, 2011.*

*Primary Examiner* — William D Cumming
(74) *Attorney, Agent, or Firm* — BainwoodHuang

(57) ABSTRACT

Methods and systems for creating mobile conference rooms for conference calls between client devices and one or more contacts are described herein. A server receives, from the client device, a request to create a mobile conference room. The server creates the mobile conference room by assigning a phone number to the mobile conference room. After notifying the client device, the server receives data regarding one or more contacts to add to the mobile conference room. The server receives, from the client device, a request to initiate a conference call with a subset of contacts. A call is received, from the server, concurrently by each of the subset of contacts. The server bridges the client device and the contacts that have answered the call on the conference call.

20 Claims, 11 Drawing Sheets

(56) References Cited

U.S. PATENT DOCUMENTS

| | | | | |
|---|---|---|---|---|
| 2004/0001446 A1* | 1/2004 | Bhatia | ........... | G06Q 10/109 370/261 |
| 2005/0281260 A1* | 12/2005 | Swanson | ........... | H04L 12/1813 370/389 |
| 2005/0283536 A1* | 12/2005 | Swanson | ........... | G06Q 10/10 709/232 |
| 2014/0066035 A1* | 3/2014 | Melin | ........... | H04W 4/16 455/416 |
| 2014/0235215 A1* | 8/2014 | Perez | ........... | H04M 3/56 455/416 |
| 2014/0323110 A1* | 10/2014 | Moon | ........... | H04W 76/043 455/418 |
| 2015/0067056 A1* | 3/2015 | Yamagiwa | ........... | H04L 65/403 709/204 |

* cited by examiner

ONE-TAP CONFERENCE CALLING ON DEVICES

FIELD

Aspects described herein generally relate to voice and video conference calling on various devices. In particular, one or more aspects of the disclosure are related to computer hardware and software for creating mobile conference rooms and initiating conference calls among devices.

BACKGROUND

Conference calls or teleconferences are useful in personal and business settings to connect multiple users together. For example, one or more users may be working in a remote location, such as at home or in a remote office, whereas other users may be working on-site, such as in a local office. Conference calls (voice and/or video) allow users in different locations to discuss, participate, and interact with each other for various purposes by bridging users together.

In a conventional conference call, an organizer may need to set up the conference bridge and provide specific dial-in information for accessing the conference call to a number of participants. For example, there may be a phone number that is associated with a conference bridge that connects users together. The organizer may need to dial this phone number to set up the conference and enter one or more specific access codes or conference codes to initiate the call. The organizer may then need to share the phone number and one or more access codes with participants. Participants may dial the phone number and enter the one or more access codes to join the conference.

However, in some instances, the organizer may forget to provide or may send incorrect dial-in information (e.g., conference phone number, access codes) to participants when setting up the conference. Alternatively, participants may misplace the dial-in information or misdial the numbers, resulting in participants being late to join the conference call. Ultimately, current methods for setting up and initiating a conference call, as well as waiting for participants to join the conference call are inefficient.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein describe techniques for conference calling among devices, including methods and systems for creating mobile conference rooms and initiating one-tap conference calls on devices.

One or more aspects of the disclosure describe a method that may include receiving, from a conferencing application on a client device, a request to establish a mobile conference room. The method may also include establishing the mobile conference room based on the request by assigning a phone number to the mobile conference room; sending, to the client device, a message indicating that the mobile conference room has been established based on the request; receiving, from the client device, data regarding one or more contacts to be added to the mobile conference room; adding the one or more contacts to the mobile conference room based on the received data; a request to initiate a conference call with a subset of contacts in the mobile conference room; concurrently calling each of the subset of contacts in the mobile conference room; determining which of the subset of contacts have answered the call; and bridging the client device and all contacts that have answered the call on the conference call.

One or more aspects of the disclosure describe a method that may include sending, to a server, a request to establish a mobile conference room through a conferencing application on a client device. The method may also include receiving, from the server, a message indicating that the mobile conference room has been established according to the request; sending, to the server, data regarding one or more contacts to be added to the mobile conference room, wherein each of the one or more contacts are notified of being added to the mobile conference room; selecting a subset of contacts added to the mobile conference room for a conference call; sending, to the server, a request to initiate a conference call between the client device and the subset of contacts in the mobile conference room, wherein each of the subset of contacts are called concurrently by the server; and launching the conference call through the conferencing application on the client device, wherein the client device and all contacts that have answered the call are bridged on the conference call by the server.

One or more aspects of the disclosure describe a system that includes at least one processor, and at least one memory storing instructions that, when executed by the at least one processor, cause the system to perform one or more steps. The steps the system may perform may include receiving, from a conferencing application on a client device, a request to establish a mobile conference room. The method may also include establishing the mobile conference room based on the request by assigning a phone number to the mobile conference room; sending, to the client device, a message indicating that the mobile conference room has been established based on the request; receiving, from the client device, data regarding one or more contacts to be added to the mobile conference room; adding the one or more contacts to the mobile conference room based on the received data; receiving, from the client device, a request to initiate a conference call with a subset of contacts in the mobile conference room; concurrently calling each of the subset of contacts in the mobile conference room; determining which of the subset of contacts have answered the call; and bridging the client device and all contacts that have answered the call on the conference call.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
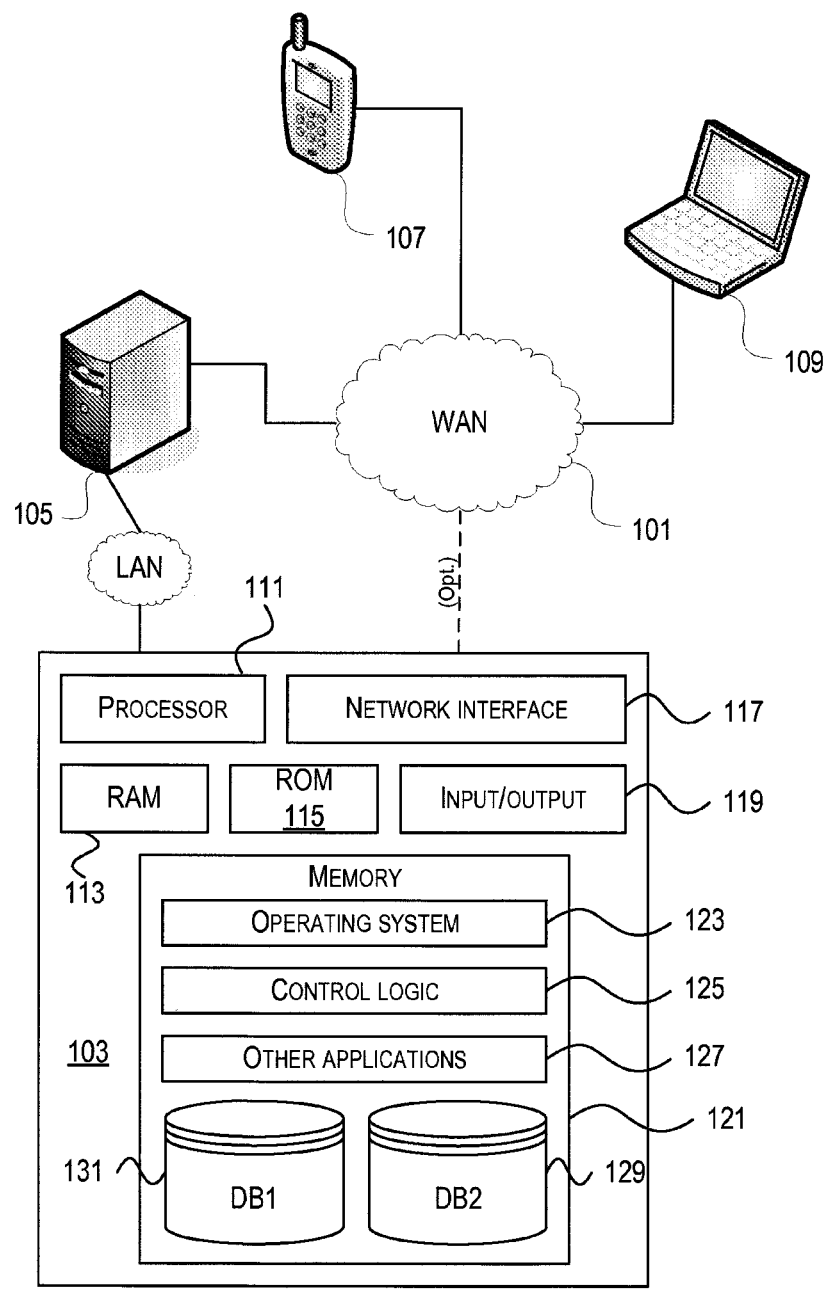
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

As a general introduction to the subject matter described in more detail below, aspects described herein are directed towards creating mobile conference rooms and initiating one-tap conference calls on client devices. A user (e.g., an organizer) may request to establish a mobile conference room by accessing a conferencing application through a user interface on a client device. The request may include a name for the mobile conference room selected by the user, wherein the request may be sent from the client device to a server. As a result, the server may establish the mobile conference room by assigning a phone number to the mobile conference room. The server may also assign the name or another identifier to the mobile conference room. After the mobile conference room has been created, one or more contacts may be added to the mobile conference room. Once the contacts have been added, the user may select a subset of contacts for a conference call. The server may concurrently call each of the subset of contacts and connect the client device and the contacts who answer the call together on the conference call. The present disclosure may be beneficial in that only one user (e.g., the organizer of the mobile conference room) may need to have the conferencing application installed on his or her user device. Other users might not need to have the conferencing application installed on their respective devices in order to participate in a conference call with the organizer. As a result, according to some aspects, the organizer may advantageously utilize the conferencing application on the client device in order to organize mobile conference rooms for communication with one or more selected contacts via conference calling and group chatting/texting functionalities.

Methods and systems supporting one or more of these features are described in further detail below. Before discussing these concepts in greater detail, however, several examples of computing devices and system architectures that may be used in implementing and/or otherwise providing various aspects of the disclosure will first be discussed with respect to FIGS. 1-4.

Computing Architecture

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
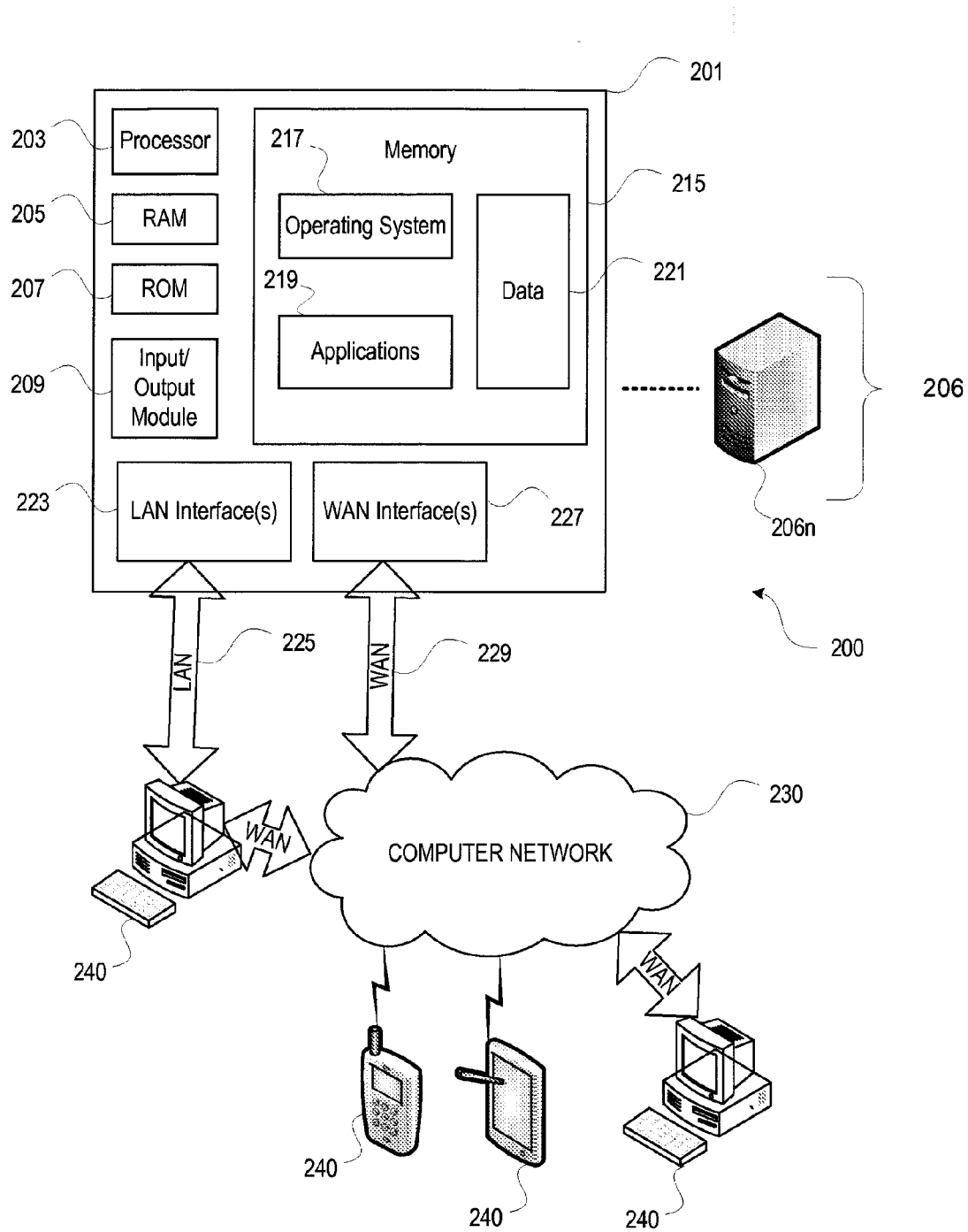
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106*a* can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

Figure 3:
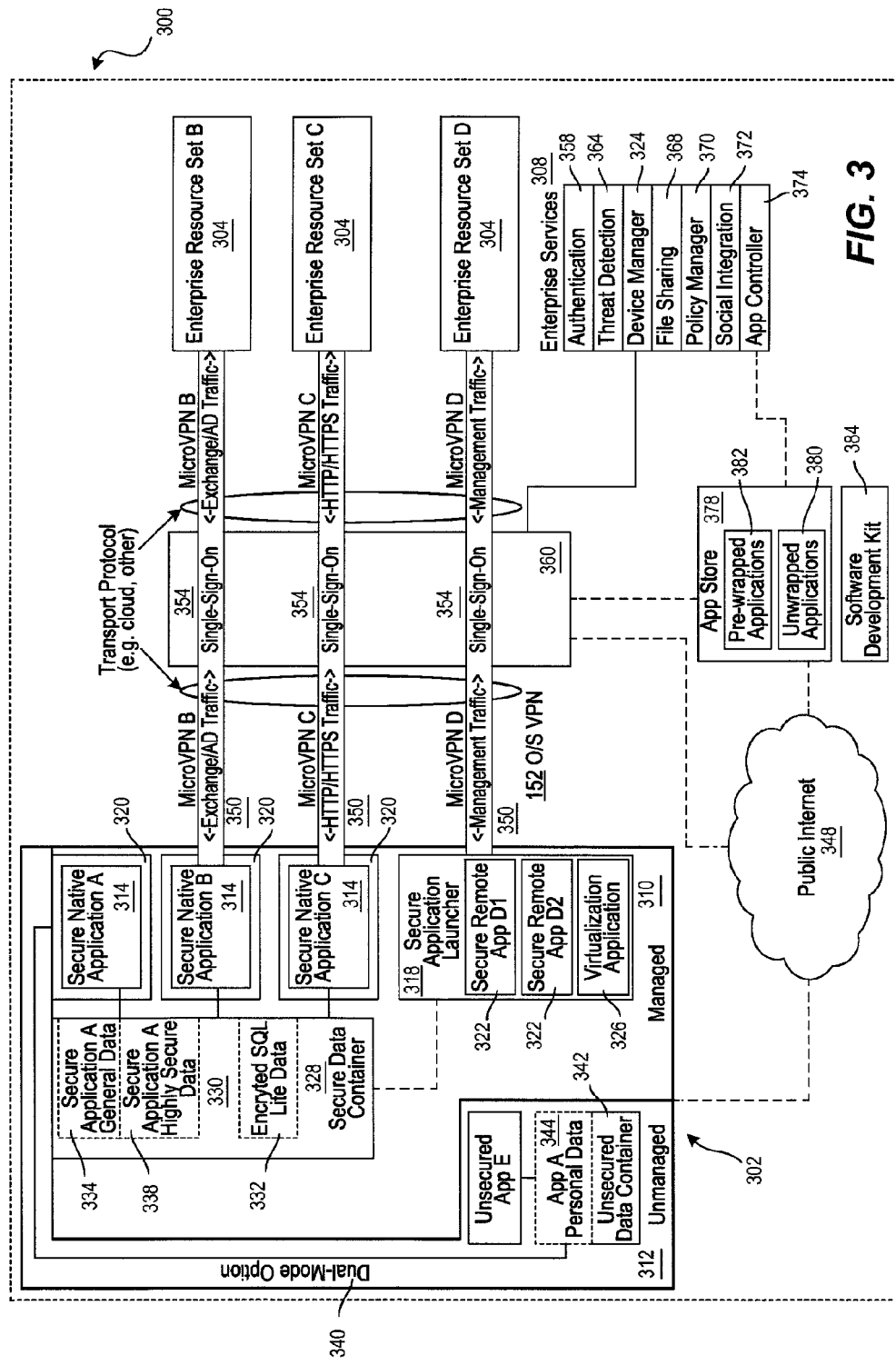
FIG. 3 depicts an illustrative enterprise mobility management system.

FIG. 3 represents an enterprise mobility technical architecture 300 for use in a BYOD environment. The architecture enables a user of a client device (e.g., mobile device) 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to user. The user may utilize the mobile device 302 for business use only or for business and personal use. The mobile device may run an iOS operating system, and Android operating system, or the like. The enterprise may choose to implement policies to manage the mobile device 302. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 302 that is managed through the application of mobile device management policies may be referred to as an enrolled device.

In some embodiments, the operating system of the mobile device may be separated into a managed partition 310 and an unmanaged partition 312. The managed partition 310 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 328 in the managed partition 310 of the mobile device. The data secured in the secure data container may be accessed by the secure wrapped applications 314, applications executed by a secure application launcher 322, virtualization applications 326 executed by a secure application launcher 322, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as Advanced Encryption Standard (AES) 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured or unmanaged mode. In an unsecured or unmanaged mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications 548 that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections, also referred to as microVPN or application-specific VPN, may be specific to particular applications 350, particular devices, particular secured areas on the mobile device, and the like 352. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use User Interface.

A software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability 388. The management and analytics capability 388 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
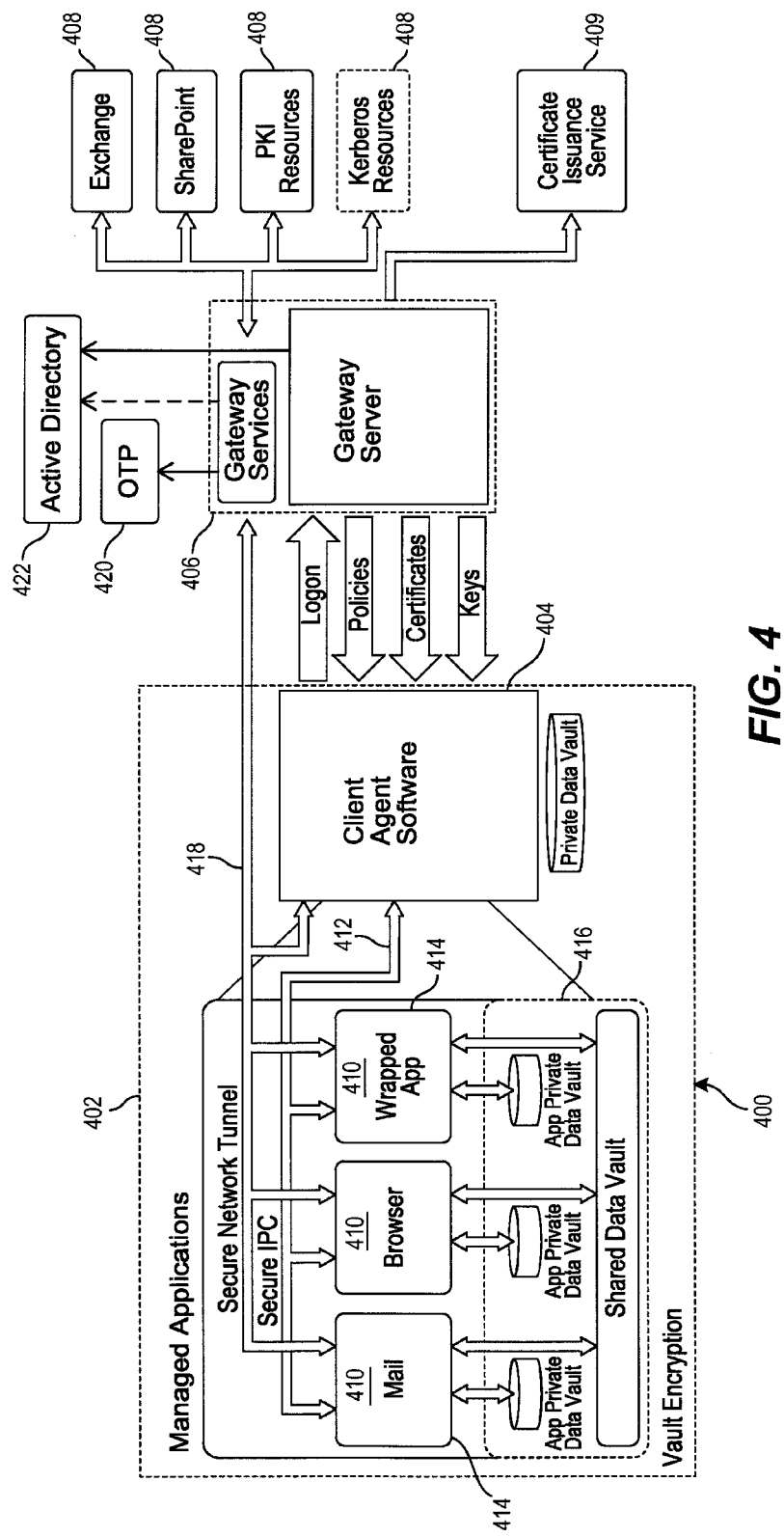
FIG. 4 depicts another illustrative enterprise mobility management system.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 400 described above with reference to FIG. 3 and may include additional features not mentioned above.

In this case, the left hand side represents an enrolled client device (e.g., mobile device) 402 with a client agent 404, which interacts with gateway server 406 (which includes Access Gateway and application controller functionality) to access various enterprise resources 408 and services 409 such as Exchange, Sharepoint, public-key infrastructure (PKI) Resources, Kerberos Resources, Certificate Issuance service, as shown on the right hand side above. Although not specifically shown, the mobile device 402 may also interact with an enterprise application store (StoreFront) for the selection and downloading of applications.

The client agent 404 acts as the UI (user interface) intermediary for Windows apps/desktops hosted in an Enterprise data center, which are accessed using the High-Definition User Experience (HDX)/ICA display remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and application management framework of this architecture act to provide policy driven management capabilities and features such as connectivity and SSO (single sign on) to enterprise resources/services 408. The client agent 404 handles primary user authentication to the enterprise, normally to Access Gateway (AG) with SSO to other gateway server components. The client agent 404 obtains policies from gateway server 406 to control the behavior of the managed applications 410 on the mobile device 402.

The Secure interprocess communication (IPC) links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the Secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the Secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through Access Gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The Mail and Browser managed applications 410 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 406 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password or biometric validation. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want StoreFront to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an Enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to Active Directory (AD) 422, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of enterprise application store and an application controller may be supported that allows users to be serviced from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Illustrative Embodiments

Having discussed several examples of computing architectures and the enterprise mobility management architecture that may be used in providing and/or implementing various aspects of the disclosure, a number of embodiments will now be discussed in greater detail. In particular, and as introduced above, some aspects of the disclosure generally relate to creating mobile conference rooms in order to quickly establish conference calls between multiple users. For example, a user may employ a client device to conduct a conference call with other users who may be using different devices, such as mobile devices (e.g., smartphones) or land line telephones. Prior to the conference call, the user may access a conferencing application installed on the client device in order to request creation of a mobile conference room and send data regarding one or more contacts to be added to the mobile conference room. The mobile conference room may be created and assigned a phone number which may be used to initiate a conference call. Additionally, the one or more contacts may be notified of being added to the mobile conference room. The user may then select a subset of contacts to communicate with in a conference call, wherein each of the subset of contacts may be called concurrently. With concurrent calling, the user may be able to communicate efficiently with each contact that answers the call in the mobile conference room. In the discussion below, various examples illustrating one-tap conferencing calling in accordance with one or more embodiments will be provided.

FIGS. 5-11 illustrate various examples of features, methods, and systems of conference calling in client devices in accordance with one or more features described herein. The features and methods described below in reference to FIGS. 5-11 may be performed by a computing device or a combination of devices, such as the various computing devices and systems shown in FIGS. 1-4. The features, steps, and methods described below in reference to FIGS. 5-11 may be performed in any order, and one or more features, steps, or methods may be omitted and/or added. FIGS. 5-11 relate to setting up mobile conference rooms via a server and initiating conference calls on a client device. For example, an end user at terminal 240 or client device 302 or 402 may send, to a server 206, a request to create a mobile conference room and data regarding one or more contacts to be added the mobile conference room. The server 206 may create the mobile conference room, assign a phone number, add the one or more contacts, and concurrently call each contact selected by the user for participation in a conference call. The user at the client device may thus be able to communicate with each contact who answers the conference call.

Figure 5:
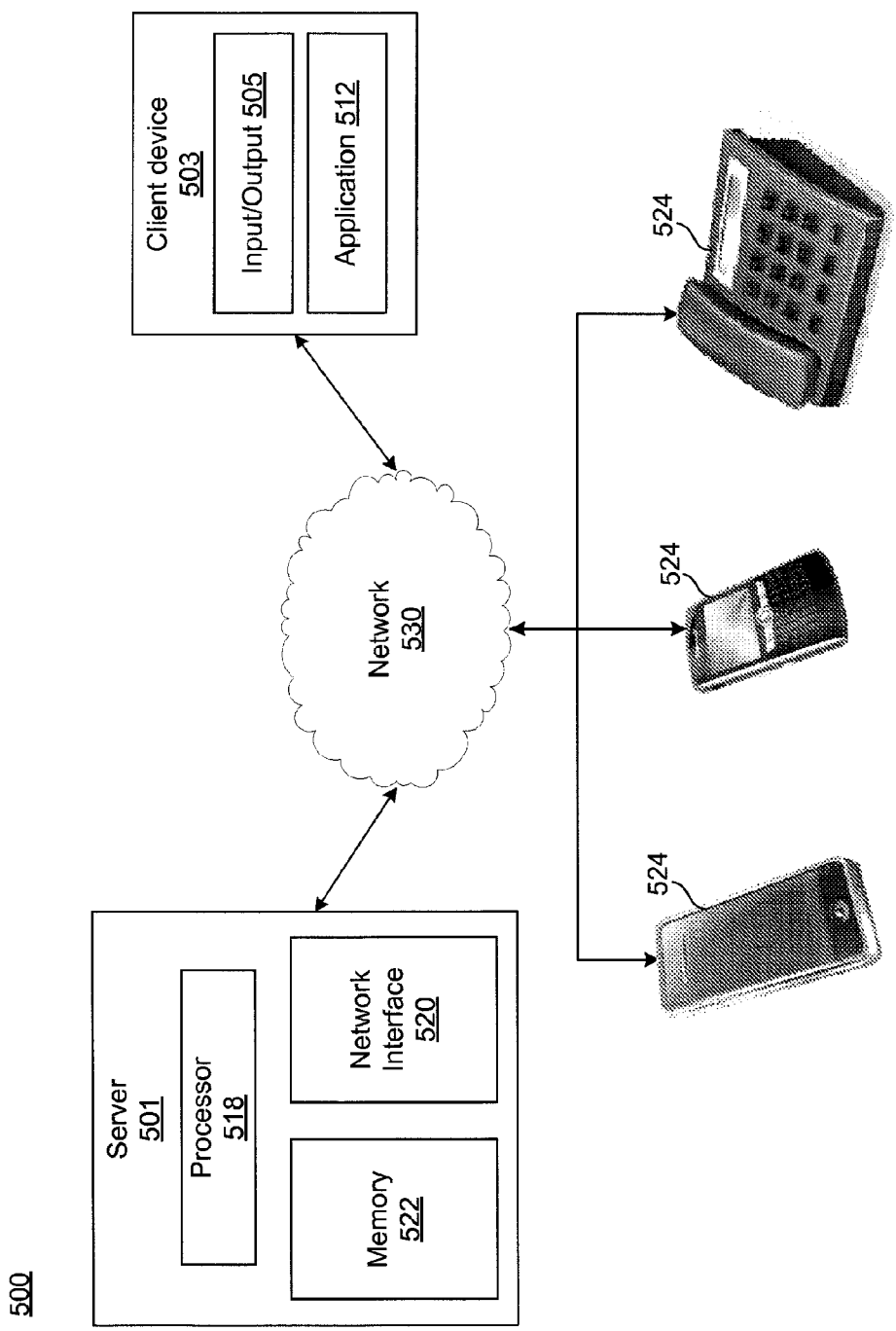
FIG. 5 depicts an illustrative system for creating mobile conference rooms through a server and initiating conference calls for a client device and one or more user devices in accordance with one or more features described herein.

In particular, FIG. 5 is an illustrative system 500 for creating mobile conference rooms through a server and initiating conference calls for a client device and one or more user devices in accordance with one or more features described herein. System 500 may include a server 501 connected to a client device 503 and a plurality of user devices 524 by a network 530. Server 501, client device 503, and user devices 524 may communicate via the network 530, in which data may be transmitted over the connection. In an embodiment, network 530 may be a local area network (LAN), a wide area network (WAN), a private network, a public network, a telecommunications network, a data communication network, a wireless network, or the like. For example, network 530 may be a wide area network (WAN) 101, such as the Internet. The network 530 may also comprise one or more networks and may use one or more of a variety of different protocols, such as Voice over Internet Protocol (VoIP). Server 501, client device 503, and user devices 524 may be connected to one or more of the networks via twisted pair wires, coaxial cable, fiber optics, radio waves or other communication media. It is understood that the system 500 may comprise any number of servers 501, any number of client devices 503, and any number of user devices 524.

In an embodiment, server 501 may be an application server that hosts an application and provides access to the client device 503. For example, server 501 may be the same as server 206, wherein server 501 may be configured to provide a conferencing application for communication with client device 503 and user devices 524. Additionally, server 501 may comprise a processor 518 that is in communication with network interface 520 and memory 522. Processor 518 may be referred to as a central processor unit or CPU and may be implemented as one or more CPU chips. The processor 518 may be configured to perform one or more steps of methods in accordance with one or more features described herein.

Network interface 520 may allow the server 501 to connect to and communicate with the network 530. Through the network 530, server 501 may communicate with client device 503, user devices 524, and other devices (not shown), such as laptops, notebooks, smartphones, land lines telephones, tablets, personal computers, servers, etc. Network interface 520 may connect to the network 530 via communication lines, such as coaxial cable, fiber optic cable, etc. or wirelessly using a cellular backhaul or a wireless standard, such as IEEE 802.11, IEEE 802.15, IEEE 802.16 etc., to name a few examples. In some embodiments, the network interface may include a modem. Further, network interface 530 may use various protocols, including TCP/IP, Ethernet, File Transfer Protocol (FTP), Hypertext Transfer Protocol (HTTP), Voice over IP (VoIP), and the like, to communicate with other client devices.

Memory 522 may be any computer readable medium for storing computer executable instructions (e.g., software). The instructions stored within memory 522 may enable server 501 to perform various functions. Memory 522 may store software used by the server 501, such as one or more operating systems, application programs, and associated data for the server 501. For example, memory 522 may further comprise application 522, which may be a conferencing application program that provides conference calling and group chatting/texting functionality to client device 503 and user devices 524. Server 501 may also store data received from client device 502 in one or more data structures in memory 522.

Server 501 may also store computer-readable instructions in memory 522 in order to facilitate conference calling in mobile conference rooms with client device 503 and user devices 524. In order for users to participate in conference calling, client device 503 may further comprise input/output (I/O) devices 505 and a conferencing application 512.

I/O devices 505 may include devices such as a microphone, keypad, keyboard, touchscreen, camera, and/or stylus through which a user of the client device 503 may provide input data. The I/O devices 505 may also comprise a display, such as a monitor, television, touchscreen, and the like. The display may present a user interface of the client device 503 that is accessible to a user associated with the client device 503.

The conferencing application 512 may be an application installed on the client device 503 with an associated graphical user interface. The conferencing application 512 may be employed by a user associated with the client device 503 to request creation of a mobile conference room and to initiate conference calls with other users associated with user devices 524. User devices 524 may comprise any number of devices, wherein each user device 524 may be associated with a user that is selected to join a mobile conference room by the user associated with the client device 503. For example, user devices 524 may comprise laptops, notebooks, smartphones, mobile phones, landlines (e.g., VOIP, ISDN or POTS lines), tablets, personal computers, servers, etc.

The conferencing application 512 may be employed for business and/or personal use. For example, conferencing application 512 may be a managed application (e.g., managed application 410) or an unmanaged application installed on client device 503. As a managed application, conferencing application 512 may execute in accordance with a set of one or more policy files received separate from the application, and which define one or more security parameters, features, resource restrictions, and/or other access controls that are enforced by a mobile device management system when the conferencing application 512 is executing on the device (e.g., client device 503). In some cases, a system administrator may manage features of conferencing application 512, such as access to a contacts list. For example, in a managed mode, a user associated with client device 503 may access a corporate address book or contact list in order to add one or more contacts to a mobile conference room. In the unmanaged mode, the user may be provided access to only the user's personal address book or contact list, without any access to the corporate address book or contact list. That is, one or more of the user's personal contacts may be added to the mobile conference room, but not any corporate contacts, while in unmanaged mode. Additionally, the system administer may manage other features of conferencing application 512, such as the use of text messaging (e.g., for notifying a contact of being added to a mobile conference room), use of a microphone (e.g., during a conference call), access to a camera on a mobile device (e.g., for adding an avatar for a user or contact), and/or access to photos stored on a mobile device (e.g., for adding an avatar for a user or contact).

In another embodiment, conferencing application 512 may be executed in an iOS operating system, an Android operating system, or the like on client device 503. As disclosed herein, the conferencing application 512 may allow a user associated with the client device 503 to access conferencing calling and group chatting functionalities. Furthermore, the conferencing application 512 may also be installed on one or more of the user devices 524. However, it might not be necessary for the conferencing application 512 to be installed on one or more of the user devices 524 in order to implement various aspects of the disclosure. For example, conference calling may be conducted between the client device 503 and the user device 524 even if the conferencing application 512 is not installed on a particular user device 524. Various examples illustrating these features are discussed below.

Figure 6:
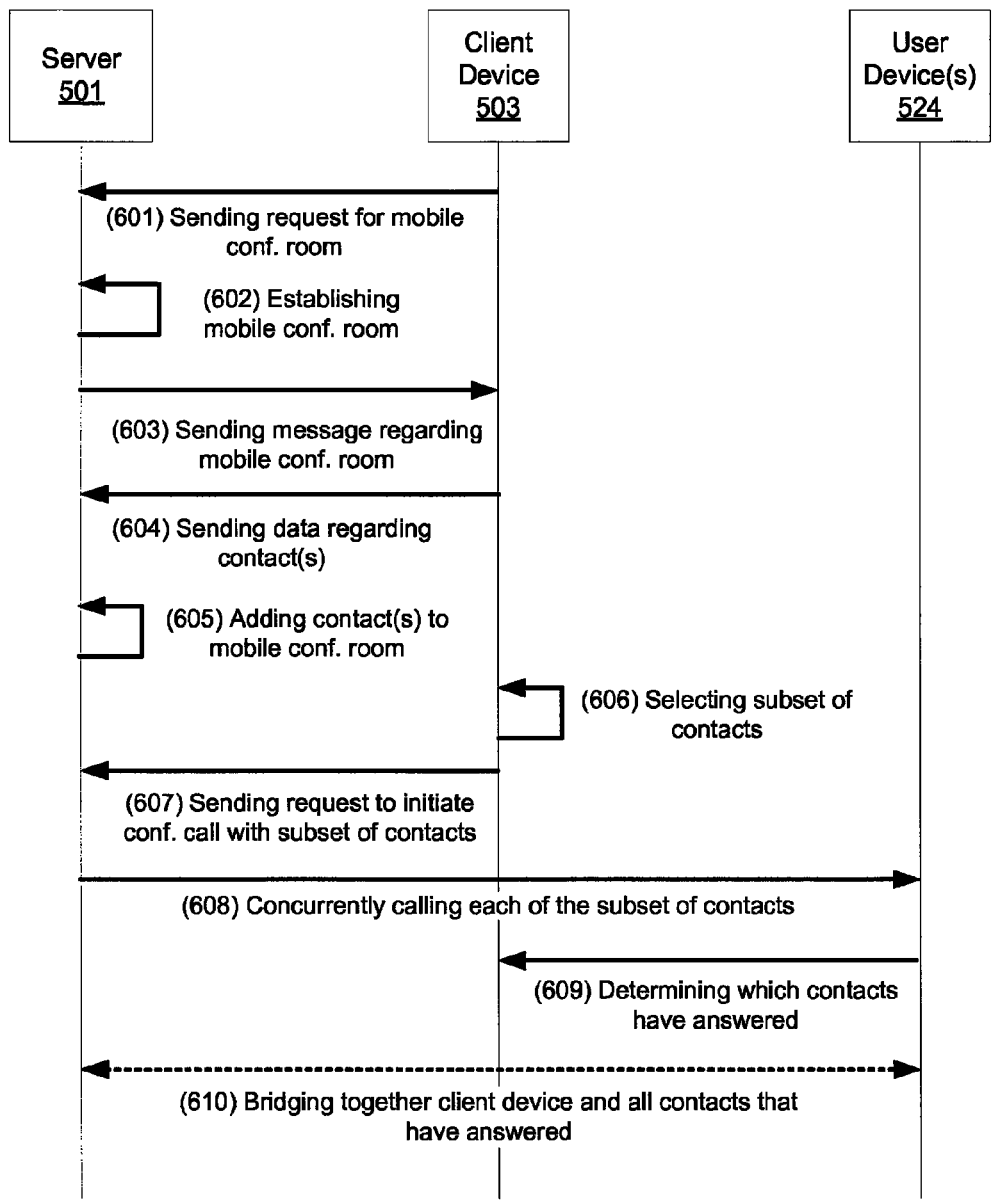
FIG. 6 depicts an illustrative sequence diagram for creating mobile conference rooms through a server and initiating conference calls for a client device and one or more user devices in accordance with one or more features described herein.

FIG. 6 is an illustrative sequence diagram 600 for creating mobile conference rooms through a server and initiating conference calls for a client device and one or more user devices in accordance with one or more features described herein. Diagram 600 shows a sequence of steps for communication between server 501, client device 503, and user devices 524. The client device 503 may comprise the conferencing application 512, which may be used to communicate with server 501 and/or user devices 524. As illustrated in FIG. 6, the sequence of steps in diagram 600 may begin at step 601 in which the client device 503 may send a request for a mobile conference room to server 501. A user associated with client device 503 may request to establish a mobile conference room by accessing the conferencing application 512 through a user interface on the client device 503. The request sent to server 501 may include a name for the mobile conference room selected by the user associated with client device 503. At step 602, server 501 may establish the mobile conference room based on the request. For example, server 501 may establish the mobile conference room by assigning a phone number to the mobile conference room. In an embodiment, server 501 may also assign a name to the mobile conference room, wherein the name is selected by the user and received in the initial request at step 601. In another embodiment, server 501 may store the name for the mobile conference room in one or more data structures in memory 522. The one or more data structures in memory 522 may also be used to store a plurality of names corresponding to other mobile conference rooms previously established, wherein each data structure may comprise various properties, such as unique identifiers, names, and avatars.

After the mobile conference room has been created, at step 603, server 501 may send, to the client device 503, a message regarding the establishment of the mobile conference room. For example, the message may indicate that the mobile conference room has been created successfully. In an embodiment, the message regarding the establishment of the mobile conference room may indicate the phone number assigned to the mobile conference room by server 501. The mobile conference room may be accessible to a user (e.g., a user associated with client device 503 or a user associated with user device 524) by dialing the phone number assigned by server 501. In another embodiment, the message regarding the mobile conference room may also indicate that server 501 has assigned the name selected by the user associated with the client device 503 to the mobile conference room. At step 604, the client device 503 may send, to server 501, data regarding one or more contacts to be added to the mobile conference room. In an embodiment, the user associated with the client device 503 may select or determine one or more contacts to add to the mobile conference room. In another embodiment, there may be a predetermined limit to the number of contacts that may be added to the mobile conference room (e.g., a maximum of 40 contacts). Data regarding the selection of one or more contacts may be sent from the client device 503 to server 501. The data regarding the one or more contacts may be used to identify the one or more contacts. In another embodiment, the data regarding one or more contacts may comprise a phone number corresponding to each contact and at least one of a first name or last name corresponding to each contact. Each contact may be associated with a respective user device 524, and the phone number corresponding to each contact may be the phone number of the respective user device 524 associated with each contact. In an embodiment, each contact may be associated with one of a mobile device or land line telephone.

Based on the data received from the client device 503, at step 605, server 501 may add the one or more contacts to the mobile conference room. In an embodiment, server 501 may associate the phone number corresponding to each contact and the first name or last name corresponding to each contact with the mobile conference room, such that each of the one or more contacts are designated as members of the mobile conference room. In an embodiment, each of the members in the mobile conference room may be called when the phone number assigned to the mobile conference room is dialed by a user. In another embodiment, server 501 may store the data regarding one or more contacts in one or more data structures in memory 522, wherein each data structure may comprise various properties, such as unique identifiers (e.g., a phone number corresponding to each contact), names (e.g., a first name and/or last name corresponding to each contact), and avatars (e.g., a small graphical image corresponding to each contact).

In some embodiments, the user associated with the client device 503 may use the conferencing application 512 to send an optional notification message to the user device 524 associated with each contact, wherein the notification message may indicate that the contact has been added to the mobile conference room. In an embodiment, the notification message sent to each of the one or more contacts (e.g., user device 524) may include the name of the mobile conference room and the phone number assigned to the mobile conference room. In another embodiment, the notification may also identify the user associated with the client device 503 as the organizer of the mobile conference room. For example, an example notification message may read as follows: "John Doe has a new conference call number XXX-XXX-XXXX and will be using it for group calls and chats with you. Save this contact." In an embodiment, it might not be necessary for a contact to have the conferencing application 512 installed on his or her user device 524 in order to receive a notification from server 501. For example, a contact may receive the notification message as a text message from the phone number assigned to the mobile conference room if the contact is not associated with a user device 524 with the conferencing application 512 installed thereon. Alternatively, the contact may receive the notification message through the user interface of the conferencing application 512 installed on his or her user device 524.

After the one or more contacts have been added, at step 606, the client device 503 may select a subset of contacts added to the mobile conference room for a conference call. That is, the user associated with the client device 503 may be the organizer and may select a number of contacts with whom to hold a conference call through the user interface of the conferencing application 512. For example, the organizer of the conference call might not need to communicate with all of the contacts added to the mobile conference room. Thus, the organizer of the conference call may select merely a few members of the mobile conference room with whom to discuss a specific project or task. In another embodiment, the user associated with the client device 503 may select all of the contacts added to the mobile conference room to participate in a conference call. Once the one or more contacts have been selected for the conference call, at step 607, the client device 503 may send, to server 501, a request to initiate the conference call with the subset of contacts in the mobile conference room. The user associated with the client device 503 may request the conference call through the user interface of the conferencing application 512. For example the user may tap an icon on the user interface (e.g., through the input/output devices 505 (e.g., display) on client device 503) in order initiate the "one-tap" conference call.

After receiving the request to initiate the conference call, at step 608, server 501 may concurrently call the user device 524 associated with each of the subset of contacts. The use of the term "concurrently" may mean "simultaneously" or not. "Concurrently" may mean that actions are performed "in parallel" or "in series" provided that it appears to a user that the actions are performed at or around the same time. For example, server 501 may call each user device 524 in parallel or in series, wherein the calls are sent out at or around the same time. In an embodiment, server 501 may perform the concurrent calling by calling multiple phone numbers at the same time (e.g., in parallel or in series), wherein each of the multiple phone numbers are associated with a different user device 524. Each user device 524 may receive a call, and at step 609, server 501 may determine which of the user devices 524 (e.g., contacts) have answered the call. In an embodiment, the contact associated with each user device 524 may need to enter one or more digits through a user interface of the user device 524 after answering the call in order to join the conference call. For example, the contact may press "1" on a keypad or a touchscreen of the user device 524 to join the conference call. In another embodiment, the user device 524 may have the conferencing application 512 installed thereon, and the contact associated with the user device 524 may join and participate in a conference call by answering the call (e.g., answering a ringing push notification) through the user interface of the conferencing application 512. At step 610, server 501 may bridge together the client device 503 and all of the user devices 524 (e.g., contacts) that have answered the call on the conference call. In an embodiment, the conference call may utilize voice over IP (VoIP) through network 530, connecting the user associated with the client device 503 and each contact (e.g., user device 524) who answered the conference call in the mobile conference room.

As an additional feature, one or more additional users may be provided with the phone number assigned to the mobile conference room in order to access the mobile conference room or an ongoing conference call, wherein the one or more additional users are non-members of the mobile conference room. That is, the one or more additional users may be invited to participate in a conference call without being added as members to the mobile conference room. For example, the phone number assigned to the mobile conference room may be distributed to one or more additional users, wherein the conference call is accessible to the one or more additional contacts by dialing the phone number. The phone number assigned to the mobile conference room may allow the one or more additional users to dial in to a conference call and/or call all of the members of the mobile conference room. In an embodiment, the one or more additional users might not be able to access the mobile conference room, unless one of the members of the mobile conference room has already initiated a conference call. For example, the one or more additional users might not be able to access the conference call unless the user associated with client device 503 or one of the members of the mobile conference room (e.g., one of the contacts associated with user devices 524) has initiated the conference call. In another embodiment, the one or more additional users may call the assigned phone number and be placed in the conference call by server 501, but server 501 might not call the members of the mobile conference room.

Additionally, members of the mobile conference room may be able to see if the mobile conference room is currently in use by accessing the conferencing application 512 on respective user devices (e.g., client device 503, user devices 524) associated with the mobile conference room members. For example, the conferencing application 512 may indicate to members that a conference call is presently occurring. Each member may choose to join the conference call by tapping an icon through the user interface of the conferencing application 512 on the user device (e.g., client device 503, user devices 524). In another embodiment, mobile conference room members may be informed that an additional user is accessing the mobile conference room, wherein the additional user may be identified by a phone number of a user device corresponding to the additional user. For example, the additional user may dial the phone number assigned to the mobile conference room from a land line telephone. Mobile conference room members may be able to see the phone number from which the additional user is calling (e.g., the phone number corresponding to the land line telephone). This feature may allow users associated with the mobile conference room to identify calls from unknown users. It may be beneficial for users to be cautious in distributing the phone number assigned to the mobile conference room to additional users, wherein the phone number may provide a direct line to the mobile conference room.

Another feature of the conferencing application 512 is a group chatting or group texting capability. In an embodiment, this feature may be provided to a user after he or she verifies his or her phone number before participating in group chat through the conferencing application 512. Depending on the device associated with each member, members of a mobile conference room may be able to send text messages to each other or chat with each other via the conferencing application 512. For example, if a user in the mobile conference room is associated with a mobile device, such as a smartphone, (e.g., client device 503 or user device 524) that has conferencing application 512 installed thereon, then the user may be able to chat with other mobile conference room members through the conferencing application 512 installed on the mobile device. However, it might not be necessary for a user to have the conferencing application 512 installed on his or her device in order to communicate with the mobile conference room members. For example, a user may have a basic mobile device without data usage or without the conferencing application 512 installed thereon. In such cases, the user with the basic mobile device may be able to communicate with the mobile conference room members by sending text messages (e.g., SMS, MMS) to the phone number assigned to the mobile conference room. For example, server 501 may assign a phone number to the mobile conference room when initially creating the mobile conference room, and this phone number may be provided to each of the members who have been added to the mobile conference room. In another embodiment, users with devices that have the conferencing application 512 installed thereon may also be able to communicate with mobile conference room members by sending text messages to the phone number assigned to the mobile conference room. In an embodiment, mobile conference room members may be able to send multimedia messages (e.g., pictures, videos, and the like) to each other by using the conferencing application 512 or by texting the phone number assigned to the mobile conference room.

Furthermore, members of a mobile conference room may be able to text each other or chat with each other while a conference call is in progress. That is, users may be able to send and receive messages to and from each other during an ongoing conference call. This feature may be particularly beneficial when not all of the members in a mobile conference room are participants in a conference call. For example, the organizer of the conference call may have selected merely a few members of the mobile conference room with whom to discuss a specific project or task. In another example, the organizer of the conference call may have selected all of the members in the mobile conference room for the conference call, but one or more of the members might not have answered when they were called. For example, one or more members may have missed the phone call from server 501. In such instances, members of the mobile conference room who are participants in the conference call may be able to communicate via group text or group chat with all of the members of the mobile conference room. This feature may allow the one or more members who either missed the conference call or were not selected to participate in the conference call to catch up on missed conversations during the earlier call.

In another embodiment, users in the mobile conference room may be able to communicate with a subset of members by using conferencing application 512. For example, a user may select one or more members in the mobile conference room with whom to chat, such that the information disclosed during the chat might not be visible to the other mobile conference room members who were not selected for the chat. In other words, mobile conference room members may be able to initiate private group chats with other members to share confidential or private information. In another embodiment, a mobile conference room member may be associated with a device that might not support group chatting or group texting functionality. For example, a user in the mobile conference room may be associated with a land line telephone. In this case, the user might not be able to participate in group chatting or group texting with the land line telephone.

The conferencing application 512 may comprise a variety of additional features available to mobile conference room members. In an embodiment, the user associated with the client device 503 may be able to remove one or more contacts from a mobile conference room through the conferencing application 512. A contact may also be able to leave a mobile conference room voluntarily or stop notifications from server 501. In another embodiment, the user associated with the client device 503 may be able to create any number of mobile conference rooms, wherein each mobile conference room has a unique dial-in phone number assigned by server 501. Mobile conference rooms may also be deleted by members, such as the user associated with client device 503 and/or by a contact associated with user device 524. If one of the members is currently using the mobile conference room for a conference call, then the mobile conference room might not be deleted. Otherwise, the mobile conference room may be deleted if none of the other users are using the mobile conference room in an ongoing conference call.

Furthermore, the conferencing application 512 may be utilized to schedule one or more conference calls with one or more contacts in a mobile conference room. That is, the user associated with the client device 503 may schedule a certain time and/or a certain day for a conference call. In some cases, the scheduled conference call may be set to repeat every day, every week, every month, or the like. For example, the user associated with the client device 503 may schedule a conference call for a specific time and date, such as 9 AM on November 1, wherein the scheduled conference call may repeat on the first of every month at the determined time. Each of the one or more contacts (or a subset of contacts) in the mobile conference room may be concurrently called at the scheduled time. Additionally, the one or more contacts in the mobile conference room may be able to schedule a conference call in the mobile conference room. In an embodiment, the user associated with the client device 503, as well as the one or more contacts added to the mobile conference room, may be able to see or check for scheduled calls for the mobile conference room through the conferencing application 512. In some embodiments, the conferencing features and the scheduled conference calling features disclosed herein may be implemented as a web application.

In another embodiment, the conferencing features disclosed herein may be implemented as a peer-to-peer (P2P) system. For example, the client device 503 and the plurality of user devices 524 may be a part of a P2P network of nodes, in which the conferencing application 512 may be installed on at least one of the client device 503 and/or the user devices 524. Any of the devices in the P2P network may be able to initiate the conference call through the conferencing application 512. In a P2P system, a first device may utilize the conferencing application 512 to initiate a conference call to other devices in the P2P network, wherein the other devices in the P2P network may be notified of the call by the first device (e.g., instead of the server notifying/calling each of the devices as it would in a client/server system). The first device may notify or call each of the other devices in the P2P network through a peer-to-peer direct messaging scheme. Each of the other devices in the P2P network may be notified by push notifications through the conferencing application 512 or SMS messages on each of the devices.

Figure 7:
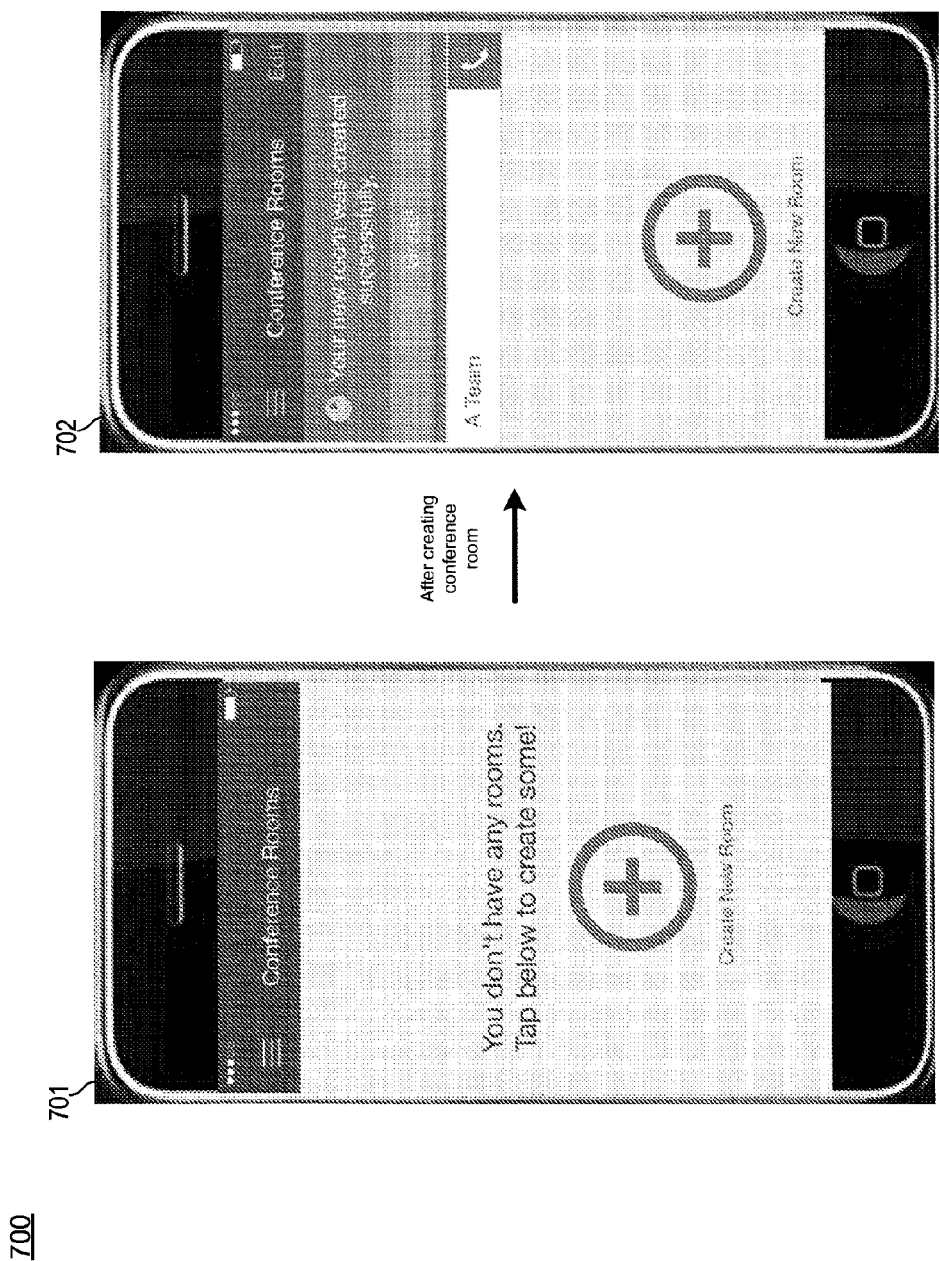
FIG. 7 depicts an illustrative diagram of an example of a graphical user interface of a conferencing application displayed on a client device in accordance with one or more features described herein.
Figure 8:
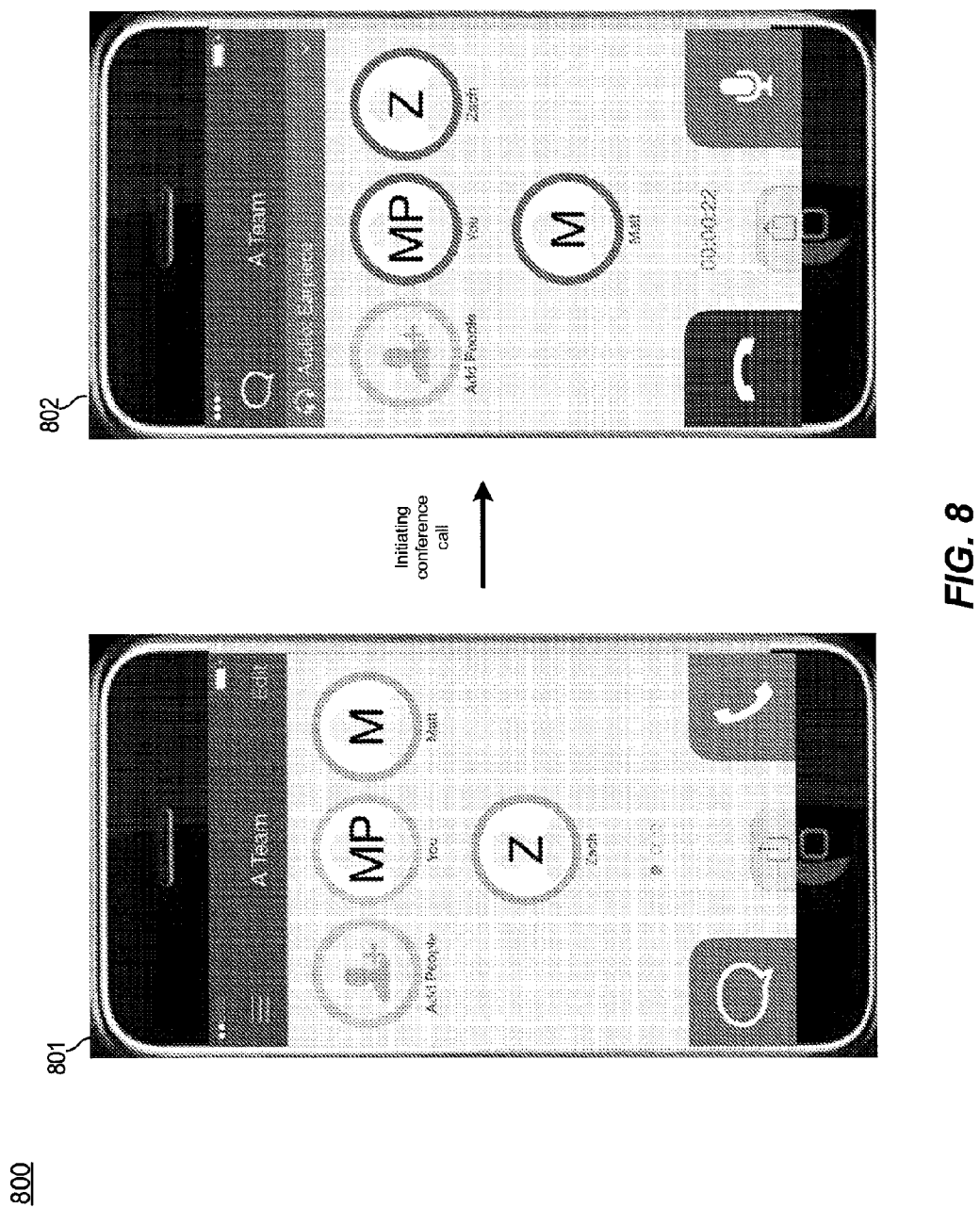
FIG. 8 depicts an illustrative diagram of an example of a graphical user interface of a conferencing application displayed on a client device in accordance with one or more features described herein.
Figure 9:
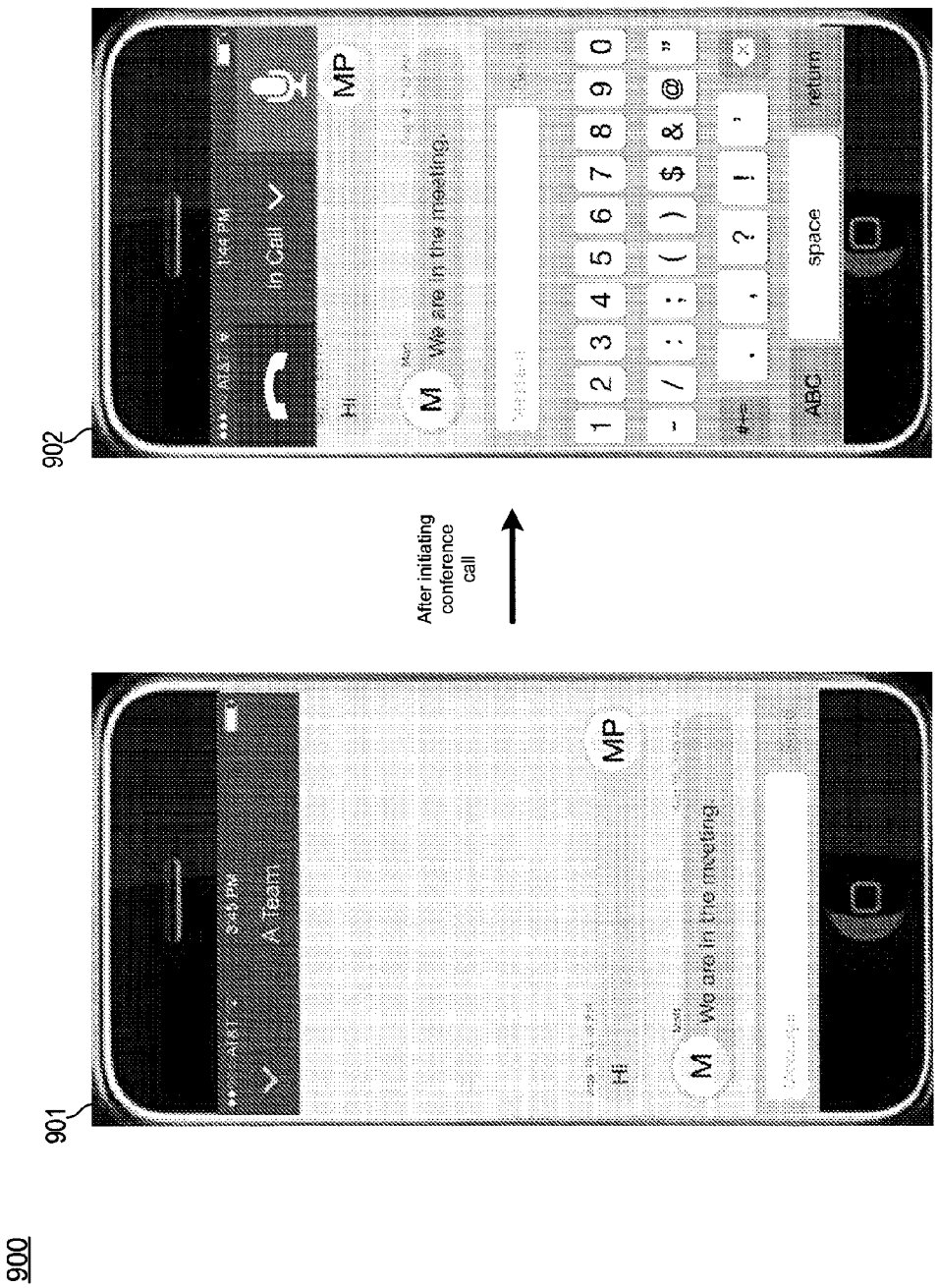
FIG. 9 depicts an illustrative diagram of an example of a graphical user interface of a conferencing application displayed on a client device in accordance with one or more features described herein.

FIGS. 7-9 each depict an illustrative diagram of an example of a graphical user interface of a conferencing application displayed on a client device in accordance with one or more features described herein. FIG. 7 illustrates example user interfaces 701 and 702 of the conferencing application 512 on the client device 503 during creation of a mobile conference room. Specifically, user interface 701 depicts what may be displayed through the conferencing application 512 prior to requesting creation of a mobile conference room. The user associated with the client device 503 may tap on an icon (e.g., a plus-sign icon) in user interface 701 in order to initiate a request for a mobile conference room. The user may then enter a name for the mobile conference room (e.g., by using a touchscreen keyboard on the user interface 701) and send the request for the mobile conference room to server 501 (e.g., as performed in step 601). User interface 702 depicts what may be displayed through the conferencing application 512 after a mobile conference room is established by server 501. For example, server 501 may receive the request for the mobile conference room from the client device 503 and create the request by assigning a phone number to the mobile conference room (e.g., as performed in step 602). Server 501 may then send a notification message indicating that the mobile conference room has been created, as depicted in user interface 702. In this example, the name of the established mobile conference room may be "A Team." In another embodiment, the user associated with the client device 503 may be able to create multiple mobile conference rooms through the conferencing application 512, wherein the name of each mobile conference room may be displayed on user interfaces 701 and 702.

FIG. 8 illustrates example user interfaces 801 and 802 of the conferencing application 512 on the client device 503 during initiation of a conference call with added contacts. Specifically, user interface 801 depicts what may be displayed through the conferencing application 512 after one or more contacts have been added to a mobile conference room (e.g., as performed in step 605). Each contact in the mobile conference room may be identified by at least one of a first and/or last name, a corresponding phone number, and an avatar. For example, contacts "Matt" and "Zach" may be added to the mobile conference room "A Team." Prior to initiating the conference call, the user associated with the client device 503 may select a subset of contacts for a call by selecting each contact's icon on user interface 801. User interface 801 may additionally illustrate an icon for group chatting (e.g., a chat bubble icon) and an icon for conference calling (e.g., a phone icon). The user associated with the client device 503 may select the icon for conference calling in order to initiate the conference call. User interface 802 depicts what may be displayed through the conferencing application 512 after the conference call has been initiated and bridged by server 501 (e.g., as performed in step 610). For example, user interface 802 may show all of the contacts that have answered the phone call and are presently on the conference call with the user associated with the client device 503. Additionally, during the conference call, conferencing application 512 may also display a call timer to monitor the time in user interface 802. In an embodiment, the conference call might not exceed a predefined limit set by the conferencing application 512. For example, the conference call may last up to four hours or another predetermined amount of time.

FIG. 9 illustrates example user interfaces 901 and 902 of the conferencing application 512 on the client device 503 during a group chat. User interface 901 depicts what may be displayed to the user associated with the client device 503 when participating in a group chat. As previously mentioned, a user may also be able to send a group chat or group text message during an ongoing conference call. User interface 902 depicts what may be displayed to the user associated with the client device 503 when participating in a group chat during an ongoing conference call. In an embodiment, mobile conference room members may be able to transmit files and multimedia to each other while conducting a conference call in order to increase efficiency during the conference call.

Figure 10:
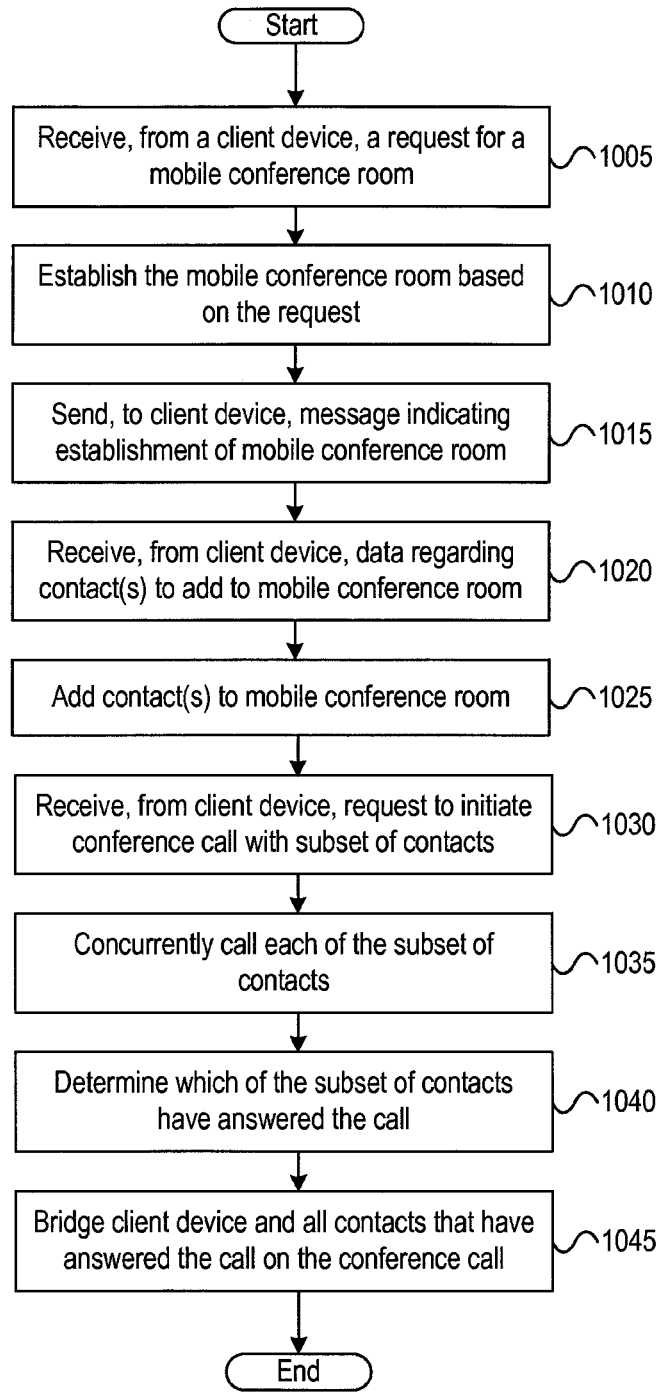
FIG. 10 depicts an illustrative flow diagram illustrating an example process of establishing a mobile conference room by a server in accordance with one or more features described herein.

FIG. 10 is an illustrative flow diagram illustrating an example process of establishing a mobile conference room by a server in accordance with one or more features described herein. In one or more embodiments, the method illustrated in FIG. 10 and/or one or more steps thereof may be performed by a server (e.g., a server such as a server 206, enterprise resource servers 304, server 406, or server 501). In other embodiments, the process illustrated in FIG. 10 and/or one or more steps thereof may be embodied in computer-executable instructions that are stored in a computer-readable medium, such as a non-transitory computer-readable memory. Alternatively or additionally, any of the steps in the method of FIG. 10 may be performed on any server.

As illustrated in FIG. 10, the method may begin at step 1005 in which a server may receive, from a client device, a request for a mobile conference room. For example, server 501 may receive, from client device 302, a request to establish a mobile conference, wherein the request is received from conferencing application 512 installed on the client device 503. At step 1010, the server may establish the mobile conference room based on the request. For example, server 501 may establish the mobile conference room based on the request by assigning a phone number to the mobile conference room. After establishing the mobile conference room, at step 1015, the server may send, to the client device, a message indicating establishment of the mobile conference room. For example, server 501 may send, to the client device 503, a message indicating that the mobile conference room has been established based on the previously received request in step 1005. At step 1020, the server may receive, from the client device, data regarding one or more contacts to add to the mobile conference room. For example, server 501 may receive, from the client device 503, data regarding one or more contacts to be added to the mobile conference room. At step 1025, the server may add the one or more contacts to the mobile conference room. For example, server 501 may add the one or more contacts to the mobile conference room based on the data received from the client device 503.

At step 1030, the server may receive, from the client device, a request to initiate a conference call with a subset of contacts. For example, server 501 may receive, from the client device 503, a request to initiate a conference call with a subset of contacts in the mobile conference room. Upon receiving the request, at step 1035, the server may concurrently call each of the subset of contacts. For example, server 501 may concurrently call (e.g., simultaneously call) each of the subset of contacts in the mobile conference room. At step 1040, the server may determine which of the subset of contacts have answered the call. For example, server 501 may determine which of the subset of contacts in the mobile conference room have answered the call, wherein each contact is associated with a user device 524. At step 1045, the server may bridge the client device and all of the contacts that have answered the call on the conference call. For example, server 501 may bridge the client device 503 and the one or more user devices 524 (e.g., each user device 524 being associated with a contact that answers the call) together on the conference call.

Figure 11:
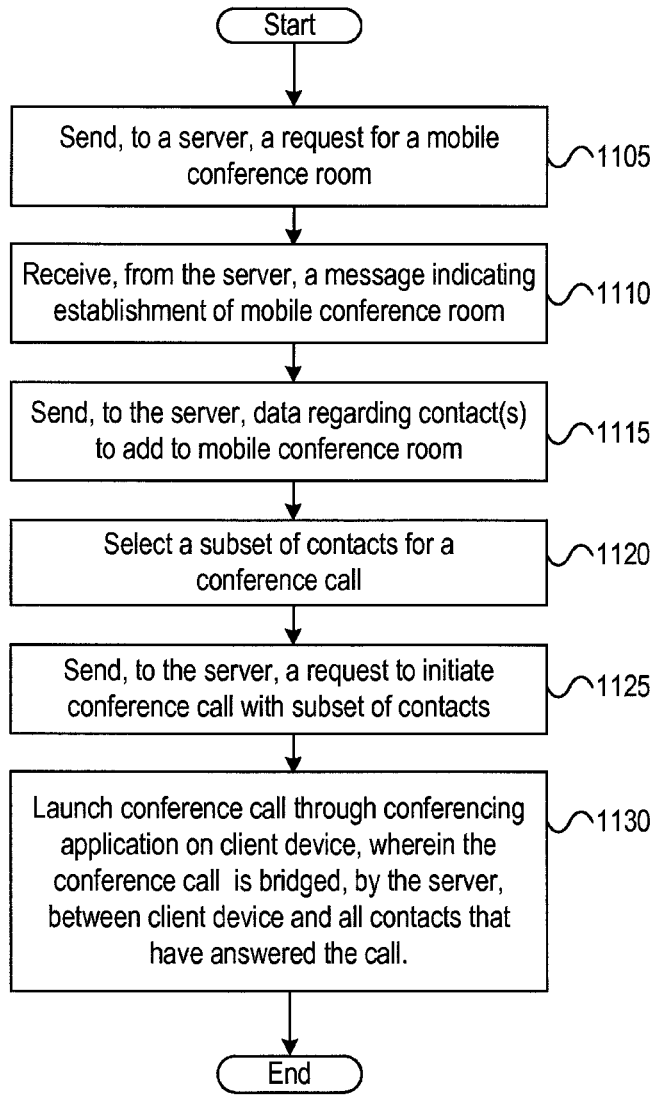
FIG. 11 depicts an illustrative flow diagram illustrating an example process of requesting a server for a conference call in a client device with one or more contacts in accordance with one or more features described herein.

FIG. 11 is an illustrative flow diagram illustrating an example process of requesting a server for a conference call in a client device with one or more contacts in accordance with one or more features described herein. In one or more embodiments, the method illustrated in FIG. 11 and/or one or more steps thereof may be performed by a computing device (e.g., a client device such as terminal 240, client device 302, enrolled mobile device 402, or client device 503). In other embodiments, the process illustrated in FIG. 11 and/or one or more steps thereof may be embodied in computer-executable instructions that are stored in a computer-readable medium, such as a non-transitory computer-readable memory. Alternatively or additionally, any of the steps in the method of FIG. 11 may be performed on any client device.

As illustrated in FIG. 11, the method may begin at step 1105 in which a client device may send a request for a mobile conference room to a server. For example, the client device 503 may send a request to establish a mobile conference room through the conference application 512 installed on the client device 503, wherein the request is sent to server 501. At step 1110, the client device may receive, from the server, a message indicating establishment of the mobile conference room. For example, the client device 503 may receive, from server 501, a message indicating that the mobile conference room has been established according to the request. At step 1115, the client device may send, to the server, data regarding one or more contacts to add to the mobile conference room. For example, the client device 503 may send, to server 501, data regarding one or more contacts to be added to the mobile conference room, wherein the one or more contacts may be selected by the user associated with the client device 503.

At step 1120, the client device may select a subset of contacts for a conference call. For example, the client device 503 may select a subset of the contacts added to the mobile conference room for a conference call. After selecting the contacts, at step 1125, the client device may send, to the server, a request to initiate the conference call with the subset of contacts. For example, the client device 503 may send, to server 501, a request to initiate the conference call between the client device and the subset of contacts in the mobile conference room, wherein each of the subset of contacts are called concurrently by the server. At step 1130, the client device may launch the conference call through a conferencing application, wherein the conference call is bridged, by the server, between the client device and all contacts that have answered the call. For example, the client device 503 may launch the conference call through the conferencing application 512 installed on the client device 503, and server 501 may bridge the client device 503 and all the contacts that have answered the call (e.g., each contact being associated with a user device 524) on the conference call.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
receiving, from a client device, a request to establish a mobile conference room, the request originating from a conferencing application on the client device;
establishing the mobile conference room based on the request by assigning a phone number to the mobile conference room;
sending, to the client device, a message indicating that the mobile conference room has been established based on the request;
receiving, from the client device, data regarding one or more contacts to be added to the mobile conference room;
adding the one or more contacts to the mobile conference room based on the received data;
receiving, from the client device, an unscheduled request to initiate a conference call with a subset of contacts in the mobile conference room, the subset of contacts selected from the contacts in the mobile conference room by the user of the client device through a user interface of the client device;
in response to receiving the unscheduled request to initiate the conference call, concurrently calling each of the subset of contacts in the mobile conference room;
determining which of the subset of contacts have answered the call; and
bridging the client device and all contacts that have answered the call on the conference call.

2. The method of claim 1, wherein the request to establish a mobile conference room comprises a name for the mobile conference room selected by a user associated with the client device.

3. The method of claim 1, wherein the contacts to be added to the mobile conference room are determined by a user associated with the client device, and wherein each contact is associated with one of a mobile device or a land line telephone.

4. The method of claim 1, wherein each contact is associated with a mobile device that has the conferencing application installed thereon.

5. The method of claim 4, wherein each contact joins and participates in the conference call through the conferencing application installed on the mobile device.

6. The method of claim 1, wherein each contact is associated with a mobile device without the conferencing application installed thereon.

7. The method of claim 6, wherein each contact receives a phone call on the mobile device, the phone call being associated with the phone number assigned to the mobile conference room.

8. The method of claim 7, wherein each contact joins the conference call by entering one or more digits through the mobile device after answering the phone call received on the mobile device.

9. The method of claim 1, further comprising:
making the conference call accessible, by the phone number assigned to the mobile conference room, to additional users who have not been added to the mobile conference room.

10. The method of claim 1, further comprising:
sending the phone number assigned to the mobile conference room to each of the one or more contacts.

11. The method of claim 1, wherein the message sent to the client device identifies the phone number assigned to the mobile conference room.

12. A method comprising:
sending, to a server, a request to establish a mobile conference room through a conferencing application on a client device;
receiving, from the server, a message indicating that the mobile conference room has been established according to the request;
sending, to the server, data regarding one or more contacts to be added to the mobile conference room, wherein each of the one or more contacts are notified of being added to the mobile conference room;
selecting, by a user of the client device through a user interface of the client device, a subset of contacts from the contacts added to the mobile conference room for a conference call;
sending, to the server, an unscheduled request to initiate a conference call between the client device and the subset of contacts in the mobile conference room, wherein each of the subset of contacts are called concurrently by the server; and
in response to receiving the unscheduled request to initiate the conference call, launching the conference call through the conferencing application on the client device, wherein the client device and all contacts that have answered the call are bridged on the conference call by the server.

13. The method of claim 12, further comprising:
initiating a group chat with the one or more contacts while the conference call is in progress.

14. The method of claim 12, further comprising:
receiving, from the server, a phone number assigned to the mobile conference room;
distributing the phone number assigned to the mobile conference room to one or more additional contacts, wherein the conference call is accessible to the one or more additional contacts by dialing the phone number.

15. The method of claim 12, wherein the data regarding one or more contacts comprises a phone number corresponding to each contact and at least one of a first name or last name corresponding to each contact.

16. The method of claim 12, wherein each contact is associated with a mobile device that has the conferencing application installed thereon, and the conference call is received by the subset of contacts through the conferencing application.

17. A system comprising: at least one processor; and at least one memory storing computer-readable instructions that, when executed by the at least one processor, cause the system to receive, from a client device, a request to establish a mobile conference room, the request originating from a conferencing application on the client device; establish the mobile conference room based on the request by assigning a phone number to the mobile conference room; send, to the client device, a message indicating that the mobile conference room has been established according to the request; receive, from the client device, data regarding one or more contacts to be added to the mobile conference room; add the one or more contacts to the mobile conference room based on the received data; receive, from the client device, an unscheduled request to initiate a conference call with a subset of contacts in the mobile conference room; the subset of contacts selected from the contacts in the mobile conference room through a user interface of the client device; concurrently call each of the subset of contacts in the mobile conference room in response to the unscheduled request; determine which of the subset of contacts have answered the call; and bridge the client device and all contacts that have answered the call on the conference call.

18. The system of claim 17, wherein the contacts to be added to the mobile conference room are selected by a user associated with the client device, and wherein each contact is associated with one of a mobile device or a land line telephone.

19. The method of claim 13, wherein the group chat comprises a mobile conference room messaging interface, and wherein a group chat message sent through the mobile conference room messaging interface comprises at least one of an SMS message, an MMS message, or a multimedia message comprising a picture or a video.

20. The method of claim 19, wherein a group chat message is a private message between a first participant of the subset of contacts and a second participant of the subset of contacts.

* * * * *